United States Patent [19]

Gilbert

[11] Patent Number: 5,788,307
[45] Date of Patent: Aug. 4, 1998

[54] PICKUP BODY PROTECTION APPARATUS

[76] Inventor: Louis A. Gilbert, 4662 Prairieburg Rd., Anamosa, Iowa 52205

[21] Appl. No.: 702,104

[22] Filed: Aug. 23, 1996

[51] Int. Cl.$^6$ .................. B62D 33/00; B60R 19/42
[52] U.S. Cl. .................. 296/32; 293/128; 293/126; 280/770
[58] Field of Search .................. 296/32, 37.6, 100; 293/126, 128; 280/769, 770, 847, 848; 224/402, 403, 404; 410/41

[56] References Cited

U.S. PATENT DOCUMENTS

| | | | |
|---|---|---|---|
| 4,789,195 | 12/1988 | Fletcher | 296/37.6 |
| 4,884,824 | 12/1989 | Radke | 280/770 |
| 4,997,227 | 3/1991 | Falzone et al. | 296/37.6 X |
| 5,207,262 | 5/1993 | Rushford | 296/100 X |
| 5,263,761 | 11/1993 | Hathaway et al. | 296/100 |
| 5,484,092 | 1/1996 | Cheney | 224/404 |
| 5,584,521 | 12/1996 | Hathaway et al. | 296/37.6 X |
| 5,641,179 | 6/1997 | Imlach | 280/770 |

*Primary Examiner*—Gary C. Hoge
*Assistant Examiner*—Jason Morrow
*Attorney, Agent, or Firm*—Allan L. Harms

[57] ABSTRACT

Protective apparatus for the sidewall of the bed of a pickup truck equipped with tool boxes is disclosed. An elongate rail is mounted to the top of the sidewall by non-invasive means and one or more skirt members may be selectively, detachably mounted to the rail when desired to overlie the sidewall below the tool boxes. In an alternative embodiment a tool box for the bed of a pickup truck has a detachable skirt member mounted to the sidewall of the tool box and depending downward to overlie the truck's sidewall.

9 Claims, 3 Drawing Sheets

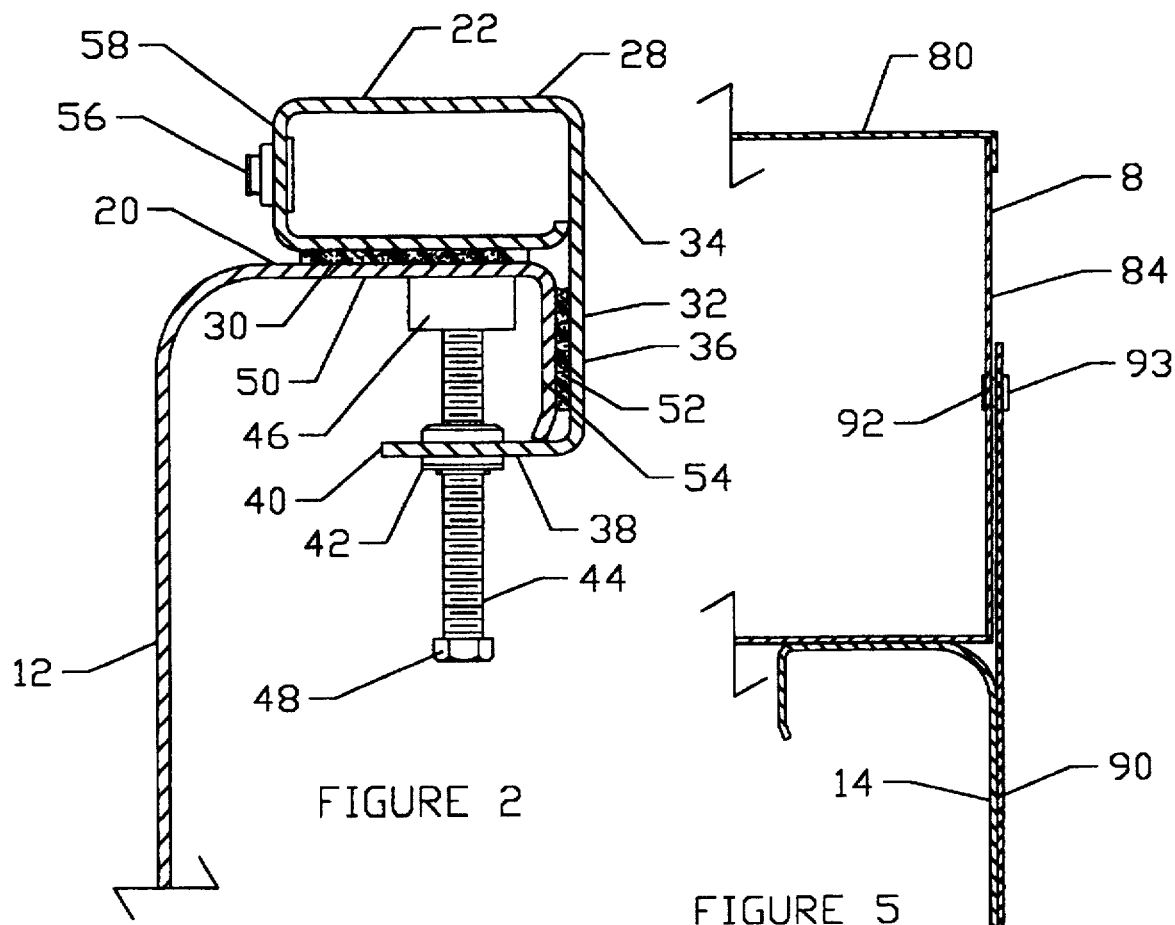
FIGURE 2
FIGURE 5
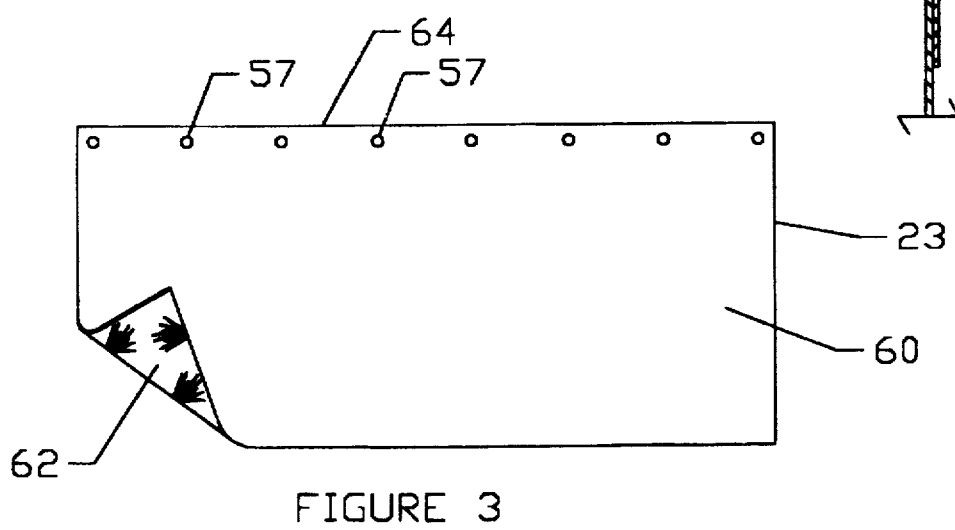
FIGURE 3

5,788,307

1

PICKUP BODY PROTECTION APPARATUS

BACKGROUND OF THE INVENTION

This invention relates to protection for the sidewalls of pickup trucks which have an open bed. Many owners of pickup trucks who work in various trades outfit the bed of their trucks with mounted tool boxes which may be elongate and mounted lengthwise to the bed sidewall or transversely mounted, resting on both sidewalls of the pickup bed. When used, such tool boxes are typically accessed by approaching the sidewall of the pickup body, opening the tool box, and reaching into the tool box to remove or replace the desired tools or other objects. It is easy in day-to-day use of the tool boxes for the pickup sidewall to become scratched or inflicted with minor dents while objects are taken from or placed into the bed mounted tool boxes. For the pickup owner who takes pride in the appearance of his vehicle, such imperfections are unacceptable.

One apparatus to protect the sidewall of automobiles on which engine work is being done is disclosed in Olson, et al. U.S. Pat. No. 5,290,618, where a protective cover is provided for the fender near the engine compartment, the cover being retained to the vehicle by an elastic cord having hooks at opposing ends. Such a device cannot easily be applied to the truck bed sidewall because of a scarcity of available features on which to hook the elastic cord, especially when tool boxes are mounted above the bed's sidewall.

Another apparatus directed to protection of body sidewalls is shown in McNeil, U.S. Pat. No. 5,312,145, wherein a foam sheet is bonded to a magnetic sheet useful to retain the foam protective sheet to the steel body of a vehicle. The device is directed to protection of car door panels in parking lots. Such a device would not be useful for vehicles having composite, nonmetallic body parts. In addition, the magnetic element of the invention will attract metal detritus which can be trapped behind the protective sheet and inflict scratches instead of protecting against them.

The patent to Sugiyama, U.S. Pat. No. 4,734,312, teaches a automobile-body-conformed, semi-rigid protective panel which requires a lug to engage a seam or raised part of the vehicle surface to retain the protective panel to the vehicle. Such a structure would not work for the generally smooth sidewall of a pickup body.

None of the aforementioned patents teaches a suitable apparatus for protection of the sidewall from incidental scratching or damage from the regular use of a tool box mounted in a pickup bed.

SUMMARY OF THE INVENTION

A protective cover for the outer sidewall of the open bed of a pickup truck may be mounted to an auxiliary rail structure detachably mounted to the existing structure of the pickup truck bed sidewall. A fabric backed sheet of flexible protective vinyl or leather-like material is cut to a generally rectangular shape and is provided with a multiplicity of snap fasteners which mate with complementary fasteners fixed to the auxiliary rail structure. The auxiliary rail structure comprises an elongate rectangular tube generally extending the length of the top of the pickup truck bed sidewall. Bracket members depend at spaced intervals from the rear wall of the tube. The bracket members comprise a first vertical segment fixed to a generally horizontal segment having a free edge. The horizontal segment is provided with one or more openings into which nuts are pressed and held. A vertically adjustable screw is threaded into each captured nut and is provided with a resilient stop on the upper end thereof, the stop engaging the underside of the horizontal section of the top of the truck sidewall. The stop provides a cushion to prevent damage to the top of the truck sidewall. A foam sheet is adhered to the underside of the tube and provides protective engagement of the underside of the tube to the top of the horizontal section of the top of the truck sidewall.

In an alternative embodiment, tool boxes mounted in the bed of the pickup are provided with fasteners on the vertical faces thereof which face the outside of the pickup body. The protective sheet is provided with mating fasteners which mate with the fasteners on the tool boxes, providing a skirt or drape which hangs from the tool boxes and overlies the outer sidewall of the pickup bed.

It is an object of the invention to provide a protective apparatus to protect the sidewall of a pickup bed from damage when objects are moved into and out of the pickup bed.

It is a further object of the invention to provide an easily attached protective cover for the sidewall of a pickup bed's sidewall which will protect the sidewall from incidental damage caused by the use of tool boxes mounted in the pickup bed.

It is a further object of the invention to provide a supporting rail structure which can support a protective cover as well as pickup bed mountable tool boxes without requiring the puncture of any surface of the pickup bed sidewall.

It is a further object of the invention to provide a removable support rail for the sidewall of a pickup bed which can be easily mounted with the use of simple hand tools.

These are other objects of the invention will become apparent from an inspection of the detailed description of the invention which follows.

DESCRIPTION OF THE DRAWING FIGURES

FIG. 2 is cross section view taken along lines 2—2 of FIG. 1 showing the detail of the structure of the rail member of the invention.

FIG. 3 is a front elevation of the skirt member of the invention with a corner thereof turned back to depict the rear side thereof.

FIG. 5 is a cross section taken along lines 5—5 of FIG. 4 showing the tool box with the skirt member of the alternative embodiment attached thereto.

DETAILED DESCRIPTION OF THE INVENTION

Figure 1:
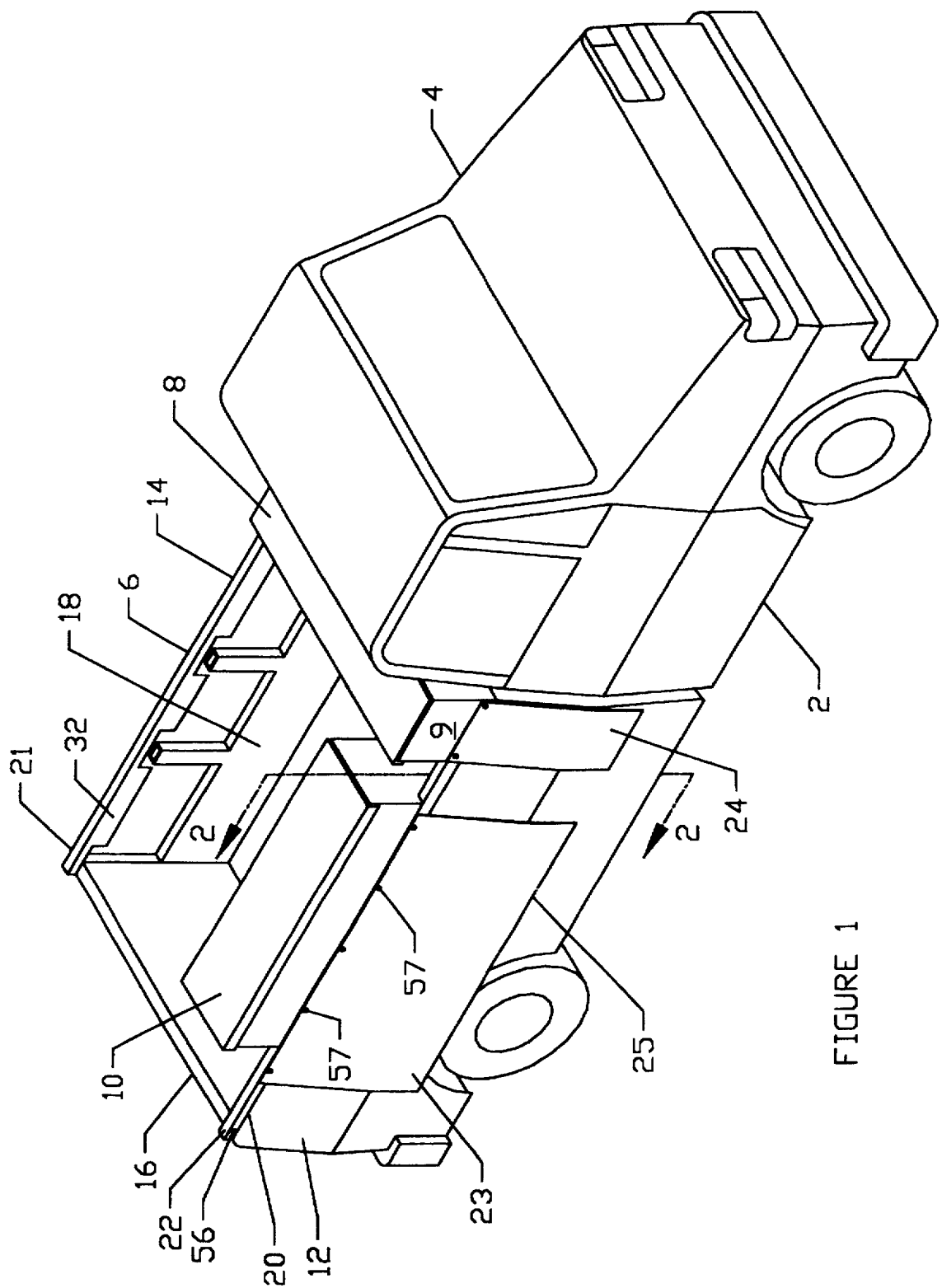
FIG. 1 is front right perspective of a pickup truck having the preferred embodiment sidewall protection invention mounted to its sidewall, the pickup truck shown having been provided with both transversely mounted and longitudinally mounted tool boxes in the bed thereof.

The preferred embodiment invention is disclosed in FIGS. 1–3. FIG. 1 illustrates a typical pickup truck 2 provided with a cab 4 and an open bed 6. Pickup bed 6 is provided with opposing sidewalls 12 and 14 and tailgate 16 which, with the front wall of the bed 6 defines a cargo carrying compartment 18 of pickup 2. A transverse tool box 8 and a longitudinal sidewall tool box 10 have been installed within cargo carrying compartment 18 of bed 6. Mounted along the top 20 of sidewall 12 is elongate rail 22 which with flexible skirt members 23 and 24 comprises the invention 25. On opposing sidewall 14 is mounted another rail 21 from which similar skirt members may be hung over the outside of sidewall 14.

Tool boxes 8 and 10 rest upon rail 22 and are fastened thereto. Skirt members 23 and 24 may be detachably fastened to rail 22 and in FIG. 1 only first rail 22 may be visualized with skirt members 23 and 24 attached thereto.

Skirt members 23 and 24 may be selectively attached and positioned along rail 22 such that protection for sidewall 12 is provided below longitudinal tool box 10 and below end wall 9 of transverse tool box 8. Varying widths of skirt members 23 and 24 may be available with one variation including a skirt member 23 which may extend the entire length of sidewall 12. A second skirt member 23 may be sized to extend the length of sidewall 14 if desired. For example, if pickup 2 is employed to carry branches or other irregular goods or debris and the tool boxes 8 and 10 are removed, skirts 23 and 24 may extend over the entire length of each of sidewalls 12 and 14 to protect the sidewalls from damage as the cargo is placed in or removed from the cargo compartment 18 of bed 6.

FIG. 2 provides detail of the structure of rail 22 and its mounting to sidewall 12 by means of the cross section view taken along lines 2—2 of FIG. 1. Sidewall 12 is provided with a generally horizontal top 20 on which rail 22 rests on first pad 30. Rail 22 comprises a rectangular tube 28 which is elongate and has a bracket 32 depending downwardly from the rear wall 34 of tube 28. Bracket 32 may be integral with the rear wall 34 of tube 28. Bracket 32 comprises a vertical segment 36 and a generally horizontal segment 38 formed along the lower edge of vertical segment 36 and having free edge 40. Horizontal segment 38 is formed to be generally parallel to top 20 of sidewall 12. An internally threaded nut 42 is captured in horizontal segment 38 to receive threaded screw 44 therewithin. Screw 44 is provided with resilient block 46 at its upper end and an engagement head 48 at its lower level. As screw 44 is driven toward the under surface 50 of top 20 of sidewall 12, block 46 will engage under surface 50 and cushion the upward force of screw 44 while allowing tube 28 to be secured to top 20 of sidewall 12. As block 46 engages under surface 50, horizontal segment 38 is urged away from tube 28. First pad 30 extends along the length of tube 28 and is adhesively secured thereto to protect top 20 of sidewall 12 from damage from the tube 28. A second pad 52 is adhesively fixed to vertical segment 36 of bracket 32 to isolate bracket 32 from terminal wall 54 of sidewall 12.

Fastener 56 is fixed in front wall 58 of tube 28 of rail 22. In the preferred embodiment, each fastener 56 comprises the male element of a snap fastener which has been riveted to front wall 58. As will be understood by reference to FIG. 1, a multiplicity of fasteners 56 are evenly spaced along the length of rail 22 with mating fasteners 57 of skirt members 23 and 24 attached to fasteners 56.

FIG. 3 illustrates a skirt member such as skirt 23 of invention 25. Skirt 23 comprises a generally rectangular sheet of flexible fabric of at least two layers, the top layer 60 being of vinyl or leather or the like and the lower layer 62 having a cushioned surface which is soft and will not scratch the finish of a vehicle sidewall such as sidewall 12 of pickup 2. Cotton or synthetic fabric may be bonded by sewing or other known means to top layer 60. A multiplicity of mating fasteners 57 which are complementary to fasteners 56 of rail 22 are provided near the upper edge 64 of skirt member 23. Mating fasteners 57 are spaced apart similarly to the spacing of fasteners 56 along rail 22, such that skirt element 23 may be attached to rail 22 at a plurality of locations.

Figure 4:
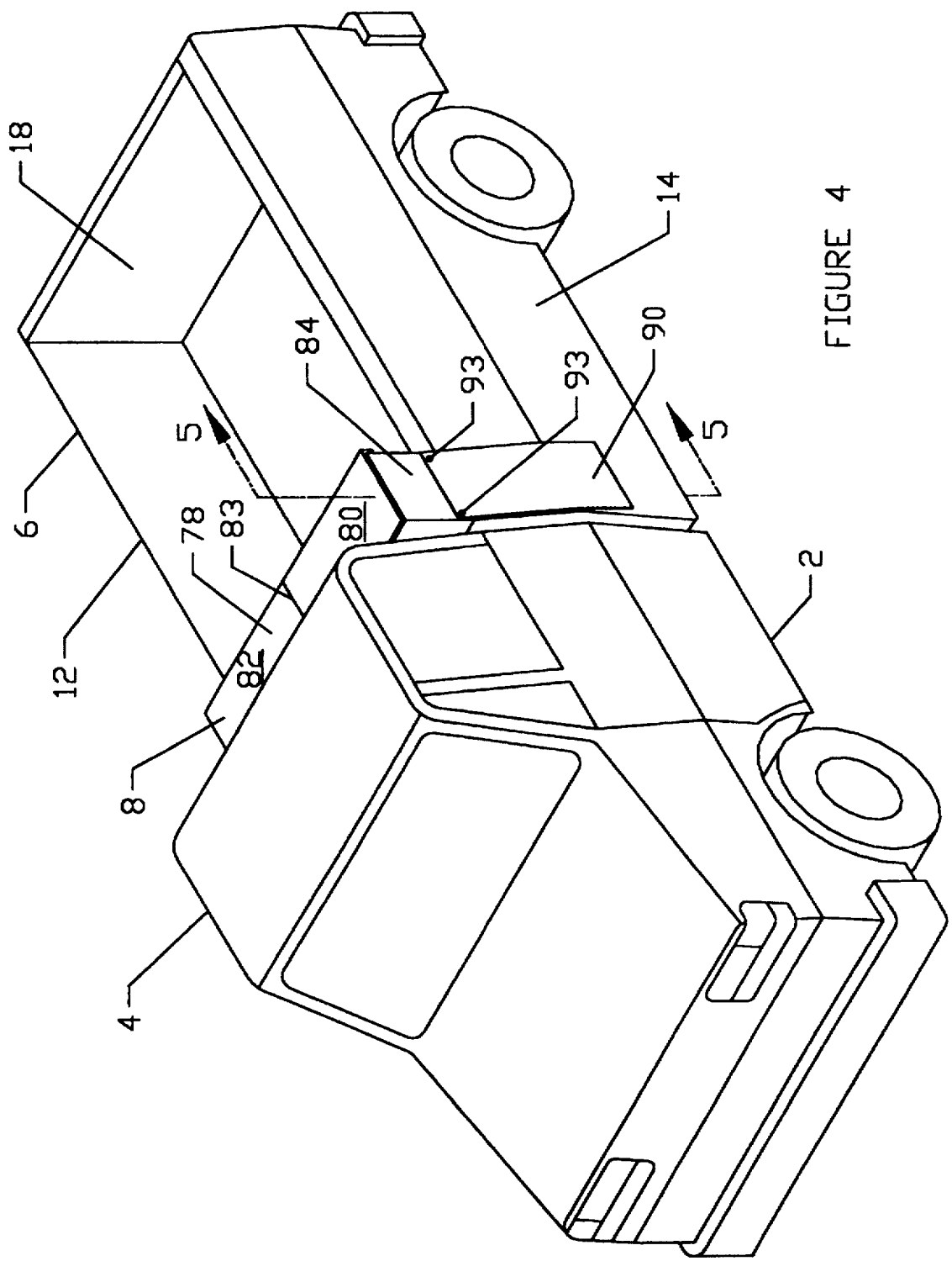
FIG. 4 is a front left perspective of a pickup truck having an open bed and having mounted therein a transverse tool box which is provided with an alternative embodiment of the sidewall protection invention.

An alternate embodiment of the invention is illustrated in FIGS. 4 and 5. FIG. 4 depicts a typical pickup truck 2 with a transverse tool box 8 in position within cargo compartment 18 of bed 6. Transverse tool box 8 is of the well known variety which rests on the opposing sidewalls 14 and 12 of bed 6 immediately behind cab 4. Tool box 8 has a pair of swinging covers 80, 82 each hinged at hinge 83 in the middle of top 78 of tool box 8. Tool box 8 is typically accessed from the side of truck 2 such that the user reaches over sidewall 14 to access tool box 8 and in so doing may lean against sidewall 14 and inflict scratches, or may drop items taken from tool box 8 onto sidewall 14 inflicting surface damage. Apron 90 is selectively fastened to tool box 8 when desired. Apron 90 hangs over and rests upon sidewall 14 and presents a barrier of protective sheeting over sidewall 14 below tool box 8. Apron 90 is contemplated to be of similar construction as skirt member 23 of FIG. 3.

Referring to FIG. 5, a cross section of tool box 8 with apron 90 attached thereto is disclosed. Front wall 84 of tool box 8 is provided with a male snap fastener 92 mounted thereto. A complementary female snap fastener 93 is fixed to apron 90 and receives male snap fastener 92 of front wall 84. Hook and loop fasteners and other equivalent means may be used in place of snap fasteners. Apron 90 may be multiple layer sheet material, preferably with a plush surface, the face thereof disposed to overlie the truck sidewall 14.

OPERATION OF THE INVENTION

The user of a pickup truck provided with the preferred embodiment invention may install a transversely mounted tool box or a longitudinal sidewall mounted tool box or both atop the rail of the invention. A suitably sized skirt member can be snapped to the rail below the tool boxes as needed when the tool box is to be opened and objects removed or inserted therein. When the pickup truck is moved, the skirt members may be easily removed and stowed away.

A pickup bed may have the rail members mounted to the sidewalls regardless whether tool boxes are installed in the cargo compartment. When objects are to be loaded into the cargo compartment over a sidewall thereof, suitable width skirt members may be fastened to the rails on each side of the pickup to provide scratch protection for the sidewall as the cargo compartment is loaded or unloaded.

Having described the invention, I claim:

1. Apparatus to protect the sidewall of the bed of a pickup truck, the pickup truck having vertical sidewalls on opposing sides of an open bed and having at least one tool box mounted within the bed and resting on at least one sidewall of the truck, the sidewalls of said truck having a top therealong, comprising an elongate rail mounted to the top of said at least one sidewall of the pickup truck, said at least one tool box resting upon the elongate rail, said rail having an array of fasteners attached therealong, at least one flexible fabric member of generally rectangular configuration, selectively mountable to said rail, said at least one flexible fabric member having a first edge with a plurality of fasteners therealong, said fasteners of said fabric member being complementary to the array of fasteners fixed to said rail, said at least one flexible fabric member disposed overlying said sidewall.

2. The apparatus of claim 1 wherein said elongate rail extends generally the entire length of said at least one sidewall, said elongate rail has a rear wall therealong, said elongate rail has at least one bracket member depending from the rear wall of said elongate rail, said at least one bracket having a horizontal section therealong, said elongate rail having a lower wall therealong, means for selectively urging said horizontal section of said bracket member away from said lower wall of said elongate rail.

3. The apparatus of claim 2 wherein said elongate rail has a cushion adhesively fixed to the lower wall thereof, said cushion interposed between said lower wall of said elongate rail and said top of said sidewall, said at least one bracket has a cushion adhesively fixed thereto, said cushion of said at least one bracket interposed between said bracket and said sidewall.

4. The apparatus of claim 3 wherein said rail comprises an elongated rectangular tube formed of a sheet of metal, said bracket is integral with said rear wall of said rail.

5. The apparatus of claim 2 wherein said means for selectively urging said horizontal section of said bracket member away from said lower wall of said elongate rail comprises a threaded screw received in said horizontal section of said bracket member, said threaded screw selectively movable vertically within said horizontal section of said bracket member, said threaded screw having an upper end thereon, said upper end of said threaded screw touchingly engageable with the lower surface of said top of said sidewall.

6. The apparatus of claim 5 wherein said threaded screw is received within a captured nut fixed to said horizontal section of said bracket, said upper end of said threaded screw having a resilient block mounted thereon, said resilient block touchingly engageable with said lower surface of said top of said sidewall.

7. The apparatus of claim 1 wherein said at least one flexible fabric member being selectively mountable to said rail at a multiplicity of longitudinal positions.

8. The apparatus of claim 7 wherein said at least one flexible fabric member having a first layer of vinyl or leather or like material, said at least one flexible fabric member having a second layer bonded to said first layer, said second layer comprises soft fabric material, said second layer touchingly engages said sidewall.

9. The apparatus of claim 8 wherein said fasteners of said elongate rail are snap fasteners, said complementary fasteners of said at least one flexible fabric receive said snap fasteners.

* * * * *